United States Patent [19]
Tasaki et al.

[11] Patent Number: 4,879,744
[45] Date of Patent: Nov. 7, 1989

[54] CARD-OPERATED TELEPHONE

[75] Inventors: Hisashi Tasaki; Kimikazu Endo, both of Kyoto, Japan

[73] Assignee: Omron Tateisi Electronics Co., Kyoto, Japan

[21] Appl. No.: 212,136

[22] Filed: Jun. 28, 1988

Related U.S. Application Data

[63] Continuation of Ser. No. 882,186, Jul. 7, 1986, abandoned.

[30] Foreign Application Priority Data

Jul. 10, 1985 [JP] Japan .................................. 60-150007

[51] Int. Cl.⁴ .......................................... H04M 17/02
[52] U.S. Cl. ...................................... 379/144; 379/91; 379/357; 235/380
[58] Field of Search .......................... 379/91, 144, 357; 235/375, 379, 380

[56] References Cited

U.S. PATENT DOCUMENTS

| | | | |
|---|---|---|---|
| 4,587,379 | 5/1986 | Masuda | 379/91 |
| 4,614,861 | 9/1986 | Pavlov et al. | 235/380 |
| 4,759,056 | 7/1988 | Akiyama | 379/197 |

OTHER PUBLICATIONS

Weinsten "Smart Cards: The Answer to Cashless shopping" *I.E.E.E. Spectrum* 2/84, pp. 43-49.
Turbat "Telepayment & Electronic Money, The Smart Card" *Commutation & Transmission* p. 5, 12/82 pp. 11-20.

*Primary Examiner*—Robert Lev
*Attorney, Agent, or Firm*—Stevens, Davis, Miller & Mosher

[57] ABSTRACT

A telephone of the type that employs a magnetic card having a certain value or worth recorded thereon, and which permits a user to cummunicate by the telephone within the limits of the remaining value of the card, records a dialed number on the card when the card is used a first time, and automatically dials the recorded number when the card is subsequently used.

7 Claims, 3 Drawing Sheets

CARD-OPERATED TELEPHONE

This application is a continuation of application Ser. No. 882,186 filed July 7, 1986 now abandoned.

BACKGROUND OF THE INVENTION

This invention relates to a telephone of the type that employs a card having a certain value or worth recorded thereon, and which permits a user to communicate by the telephone within the limits of the remaining value of the card.

The term "telephone" as used herein is not limited to a device for voice transmission but also covers such devices as telecopiers, also referred to as facsimile machines, terminals for data transmission and the like, which are connected by telephone or communication lines. Thus, the term "communication" as used herein includes the concept of data transmission as well as the transmission of voice signals.

Telephones which permit communication by use of a magnetic telephone card have proliferated in recent years. Rather than requiring that a user pay the telephone charge in cash each time that a communication is made, a card-operated telephone accepts payment by diminishing value data recorded on the card, which the user purchases in advance. The original value of the card is decided by the amount the user pays at the time of purchase. Thus, the telephone card is merely used as a substitute for cash payment.

A magnetic telephone card of the type described above has a magnetizable recording surface on which a large quantity of information can be stored in the form of a magnetic recording. It would be highly advantageous if such a telephone card could be provided with a large number of functions by exploiting its magnetic recording capability. So-called IC card, which comprises a microprocessor, memory, contacts for inputting or outputting data, and so on, provided within the card, also has a capability of storing a large quantity of information.

SUMMARY OF THE INVENTION

Accordingly, an object of the present invention is to provide a card-operated telephone endowed with a greater number of practical functions by utilizing the recording or storing feature of such cards.

Another object of the present invention is to provide a card-operated telephone adapted to record or store a dialed number on or in the card when the card is used a first time, and to automatically dial the recorded number when the card is used thereafter.

According to the present invention, the foregoing object is attained by providing a card-operated telephone having a card reader for reading card data, which is inclusive of value, stored in a telephone card, which telephone permits a user to communicate within the limits of the value included in the card data. The card-operated telephone comprises: means for determining whether the telephone card is being used a first time; means for reading and storing dialing data (data indicative of the other party's telephone number or abbreviated telephone number) in a case where the telephone card is being used a first time; means for writing the stored dialing data into the telephone card at the end of communication in the case where the telephone card is used a first time; and automatic dialing means, operable when the telephone card is used other than a first time, for transmitting a dialing signal based on dialing data read from the telephone card.

The telephone card includes a magnetic card, IC card comprising a memory as described above and cards of other types having a value recorded thereon.

Whether or not the telephone card has been used a first time can be judged based on the data read from the card. Since dialing data will have already been written into the card when it is used a second time or more, the absence of dialing data among the card data will indicate that the card is being used a first time, whereas the presence of the dialing data means that the card is being used a second time or more. It is of course possible to adopt an arrangement in which the user is allowed to key in the fact that the card is being employed a first time.

Reading of the dialing data can be achieved by decoding (which also includes detecting) the dialing signal transmitted from the telephone. The dialing signal referred to here is intended to include the meaning of a push-button signal produced by a push-button dialing-type telephone. In the latter case, reading the dialing data can be performed by picking up the signal produced by the push-button contacts.

Automatic dialing can be achieved by artificially producing a dialing signal conforming to the dialing data (the dialed number), by connecting switches in parallel with the push buttons of a push-button type telephone and actuating these switches electrically if the telephone is of the push-button type, or by various other ways.

The writing means may be adapted to write the dialing data into the telephone card after a write confirmation input has been made. If there is no write confirmation input, the dialing data will not be written into the telephone card. Therefore, when it is judged whether the card is being used the first time on the basis of the card data, the decision rendered will always be that the card is being used the first time so long as no dialing data has been written into the card.

By adapting the automatic dialing means so as to transmit the dialing signal after an automatic dialing selection input has been made, any number can be dialed manually even if the card has been used two or more times.

In accordance with the invention as described above, the dialing signal is transmitted automatically, based on dialing data previously stored on the telephone card, when the card is used a second time or more. This eliminates the labor of manual dialing. In addition, if the user forgets the telephone number of the other party, communication is still possible as long as the user has the telephone card in his possession. Since the dialing data (telephone number) dialed manually at the first use of the card is recorded on or stored in the card by the telephone, the user need not possess a dialing data recording device or the like.

Preferably, in a case where it is allowed to use two or more telephone cards for a single communication, namely in a card-operated telephone that, when the value of one telephone card becomes zero, accepts insertion of a second telephone card still having some value and permits the communication to continue, the dialing data recorded on the first telephone card are transferred to the second telephone card automatically or, if desired, selectively in response to a key input.

These and other characterizing features of the present invention will become clear from a description of pre-

DETAILED DESCRIPTION OF THE PREFERRED EMBODIMENT

Figure 1:
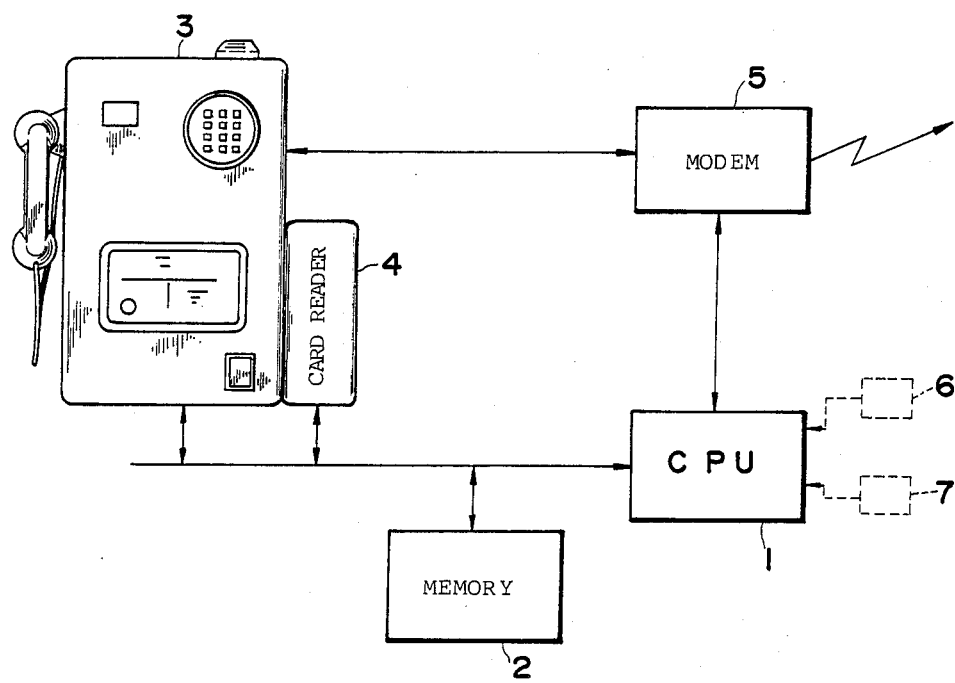
FIG. 1 is a block diagram illustrating the electrical configuration of a magnetic card-operated telephone embodying the present invention.

FIG. 1 illustrates an embodiment of a magnetic card-operated telephone configuration according to the present invention. The telephone is controlled by a CPU 1 or, preferably, by a microprocessor. The CPU 1 is equipped with a memory 2 in which the control program executed by the CPU 1 is loaded, and which is for storing the necessary data. In addition to possessing an ordinary communication function, dialing function and call signal transceiver function, a telephone circuit 3 has a dialing data (i.e. the telephone number of the party to be dialed automatically) detection function and an automatic dialing function. Connected to the telephone circuit 3 as peripheral equipment is a magnetic card reader/writer 4 for reading data from a magnetic telephone card and for writing the necessary data into the card. The telephone circuit 3 sends and receives communication signals via a modem 5. The CPU 1 is connected to the telephone circuit 3, card reader/writer 4 and modem 5.

Figure 2:
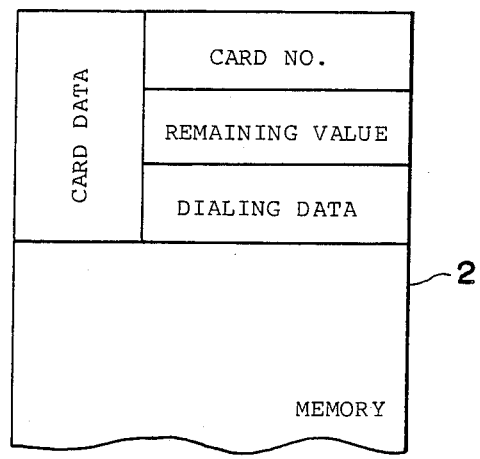
FIG. 2 is a view useful in describing the contents of a memory.

FIG. 2 shows a portion of the contents of memory 2, which is for storing card data read from the telephone card or to be written into the card. As shown in FIG. 2, a card issue number (Card No.), which includes a code indicative of the telephone card, the remaining value or worth of the card (i.e. the remaining number of times the card may be used for communication of unit distance and unit time), and the dialing data showing the party to be dialed automatically, are to be recorded on, or have already been recorded on, the telephone card.

Figure 3:
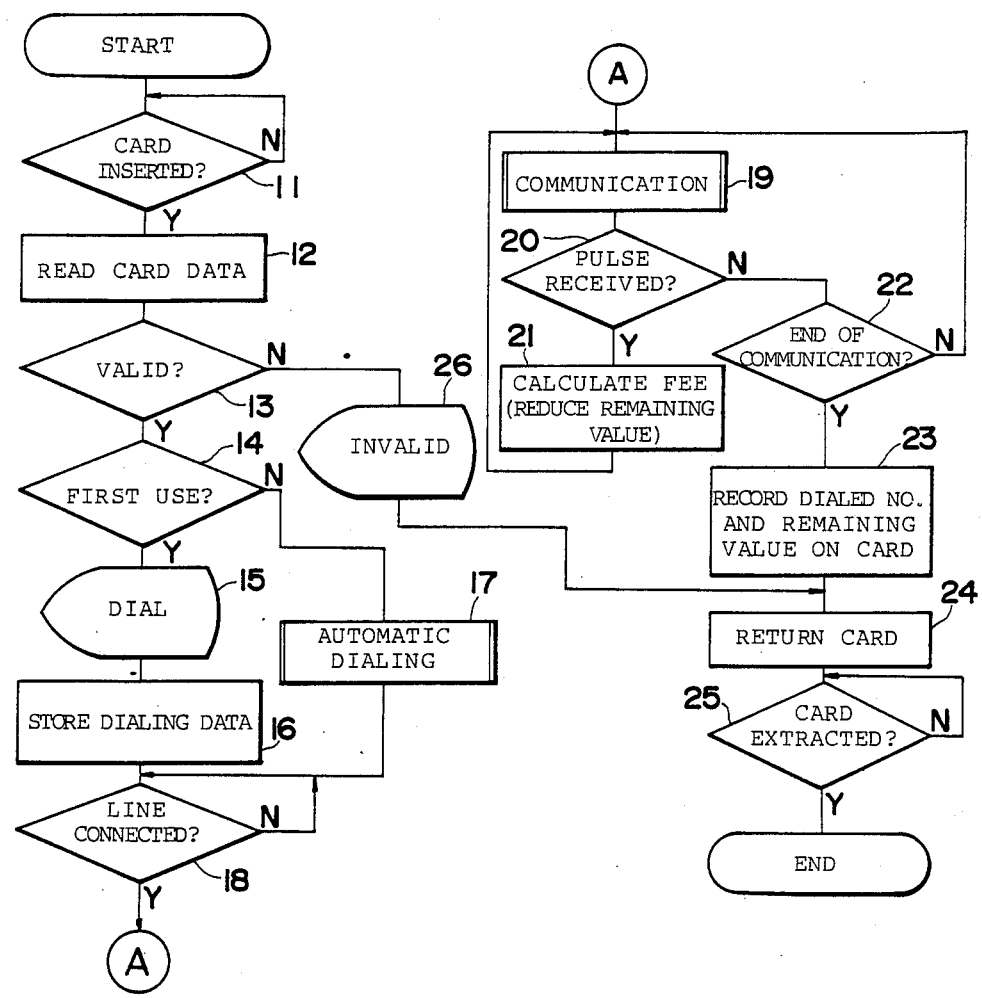
FIG. 3 is a flowchart illustrating the manner in which processing is executed by the telephone of FIG. 1.
Figure 4:
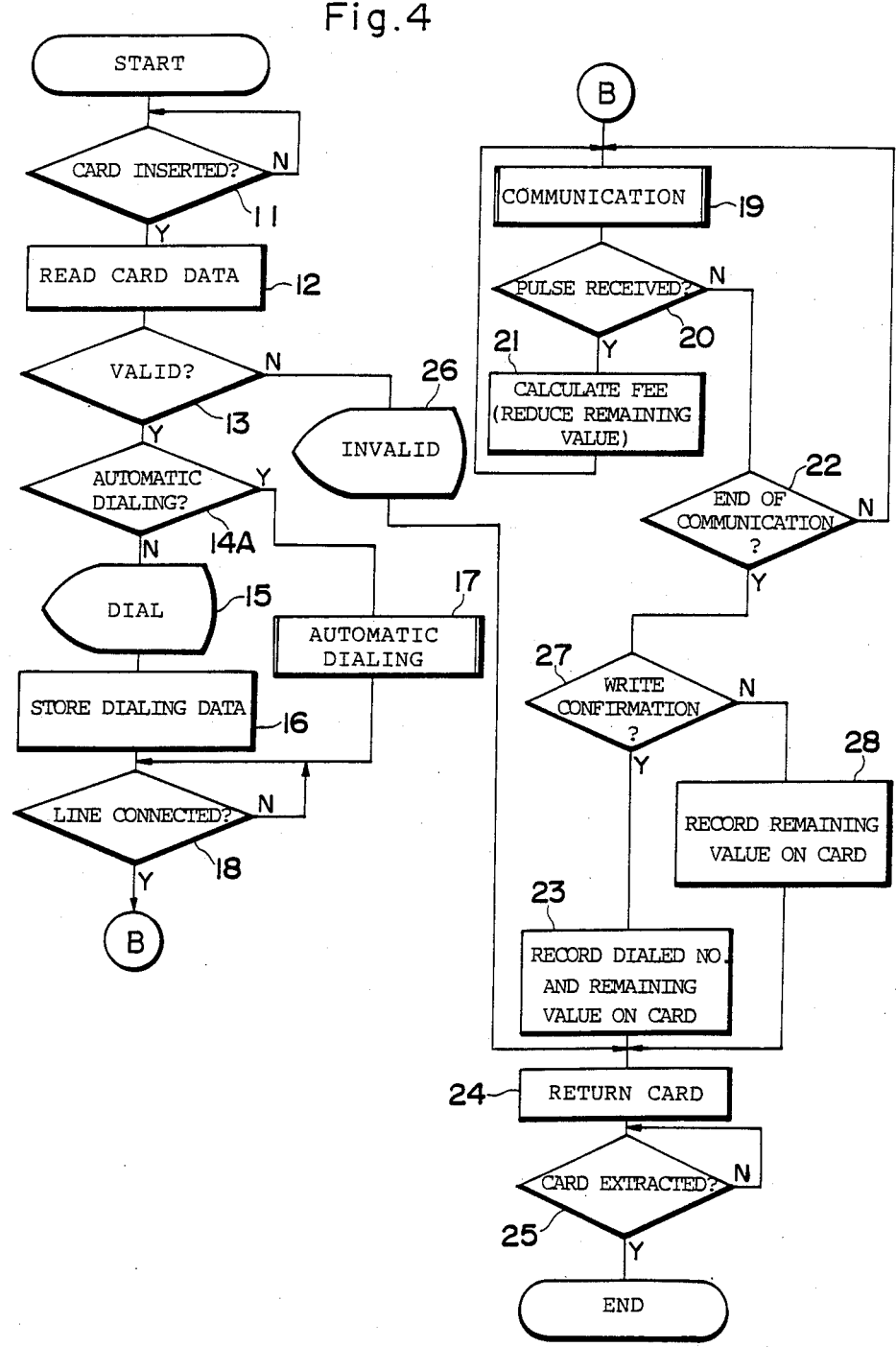
FIG 4 is a flowchart showing a modification of the processing illustrated in FIG. 3.

FIG. 3 illustrates the sequence of processing executed by the above-described card-operated telephone, particularly its CPU 1.

When the telephone card is inserted into the card reader/writer 4, this is sensed at a step 11. Data recorded on the card are read by the card reader/writer 4 and stored in the memory 2 at a step 12. This is followed by a step 13, at which it is determined whether the card inserted is a proper telephone card (i.e. whether the code indicative of telephone card is included in the card data) and whether the remaining worth of the telephone card is zero. If the card is found to be a proper telephone card and to still have value, i.e., to be valid, at the step 13, then it is determined at a step 14 whether the card is being used the first time.

If the card data do not contain data relating to a party to be dialed automatically (dialing data), then this indicates first use of the card. In such case, a visual prompt calling for the user to dial manually is displayed on a display device or indicator, not shown, at a step 15. Since the user responds by dialing manually, the telephone circuit 3 transmits a dialing signal and the dialing data (the dialed number of the party called) is sensed and stored in the memory 2 at a step 16.

If data indicative of a party to be dialed automatically are found to be contained in the card data at the step 14, then the program proceeds to a step 17, at which the telephone circuit 3 transmits a dialing signal for the telephone number indicated by these data.

The steps 16 and 17 are followed by a step 18, at which it is detected, based on a change in the line voltage polarity, whether the connection to the called party has been made. If the connection is achieved, the program proceeds to a step 19, at which communication becomes possible. This is followed by a step 20, at which billing pulses, the period of which are dependent upon the time and distance of the communication, are received from the telephone office. Each time a billing pulse is received, the remaining worth (remaining number of times the card can be used for communication of unit time and unit distance) of the card, which is contained in the card data stored in memory 2, is diminished by a predetermined value at a step 21. An arrangement may be adopted in which the communication is cut off if the remaining worth of the card becomes zero.

If the calling or called party hangs up, communication is terminated. This is judged at a step 22. A YES decision causes the card data stored in memory 2 to be written into the telephone card by the card reader/writer 4. Thus, the remaining value of the telephone card is updated and the data relating to the party to be dialed automatically (dialing data) are recorded on the telephone card at a step 23. Thereafter, the card is returned to the user at a step 24. When the user extracts the card from the card reader/writer 4 at a step 25, processing is terminated.

Note that if the card is found to be invalid at the step 13, the program proceeds to a step 26, at which the proper indication is made on the display device or indicator. The card is then returned to the user.

It is permissible to adopt an arrangement as shown in FIG. 6, in which the CPU 1 is provided with a key 6 (FIG. 1) for selecting automatic dialing or manual dialing, wherein the program will proceed to the automatic dialing processing step 17 only if automatic dialing is selected by the key 6 at a step 14a. For automatic dialing, of course, it will be necessary for the recorded data read from the telephone card to contain the data relating to the number of the party to be dialed automatically.

Another possible arrangement is one in which the CPU 1 is provided with a key 7 for confirming write-in of the number to be dialed automatically. In such an arrangement, the data relating to this number would be written into the telephone card only if confirmation were made by pressing key 7 at a step 27. It goes without saying that the remaining value of the telephone card would still be updated even if the number to be dialed automatically were not written into the card at a step 28.

As many apparently widely different embodiments of the present invention can be made without departing from the spirit and scope thereof, it is to be understood that the invention is not limited to the specific embodiments thereof except as defined in the appended claims.

What is claimed is:

1. A card-operated telephone having a card reader for reading card data, which is inclusive of value, stored in a telephone card, which telephone permits a user to communicate within the limits of the value included in the card data and comprises:
- means for determining whether the telephone card is being used a first time;
- means for reading and storing dialing data in a case where the telephone card is being used a first time;
- writing means for writing the stored dialing data into the telephone card at the end of communication in the case where the telephone card is being used a first time; and
- automatic dialing means, operative when the telephone card is used other than a first time, for transmitting a dialing signal based on the dialing data read from the telephone card.

2. The telephone as defined in claim 1, wherein said writing means writes the dialing data into the telephone card after a write confirmation input is made.

3. The telephone as defined in claim 1, wherein said automatic dialing means transmits the dialing signal after an automatic dialing selection input is made.

4. A card-operated telephone having a card reader for reading card data, which is inclusive of value, stored in a telephone card, which telephone permits a user to communicate within the limits of the value included in the card data and comprises:
- first means associated with said card reader for reading dialing data from a telephone card and storing the read dialing data,
- second means for detecting and storing dialing data representing dialing signals transmitted from the telephone,
- writing means for writing the dialing data stored in the second means into the telephone card at the end of a telephone communication and in response to the existence of a predetermined condition,
- means for setting an automatic dialing mode, and
- automatic dialing means, operative when an automatic dialing mode is set, for transmitting a dialing signal based on the dialing data stored in the first means.

5. A card-operated telephone as in claim 4, wherein said predetermined condition is the setting of a card writing condition, said telephone further comprising means for setting said card writing condition.

6. A card-operating telephone as in claim 5 wherein said means for setting said card writing condition is an operator actuated key.

7. A card operated telephone as in claim 4 wherein said means for setting an automatic dialing mode is an operator actuated key.

* * * * *